United States Patent [19]
Hesener

[11] 3,909,959
[45] *Oct. 7, 1975

[54] APPARATUS FOR PLAYING AN EDUCATIONAL GAME INCLUDING AUTOMATIC VERIFICATION MEANS

[76] Inventor: Walter Hesener, 66 rue de la Prulay, 1217 Meyrin, Geneva, Switzerland

[ * ] Notice: The portion of the term of this patent subsequent to Dec. 25, 1990, has been disclaimed.

[22] Filed: July 25, 1973

[21] Appl. No.: 382,501

Related U.S. Application Data

[62] Division of Ser. No. 129,469, March 30, 1971, Pat. No. 3,780,453.

[30] Foreign Application Priority Data

| Mar. 31, 1970 | Switzerland | 4696/70 |
| Mar. 29, 1970 | Switzerland | 8136/70 |
| Sept. 5, 1970 | Switzerland | 13300/70 |
| Nov. 20, 1970 | Switzerland | 17285/70 |
| Nov. 30, 1970 | Switzerland | 17659/70 |

[52] U.S. Cl. .................... 35/48 R; 35/9 R
[51] Int. Cl. .......................... G09b 3/00

[58] Field of Search .............. 35/9 A, 9 R, 48 R

[56] References Cited
UNITED STATES PATENTS

| 2,311,055 | 2/1943 | Kopas | 35/48 R X |
| 2,690,621 | 10/1954 | Dean | 35/9 A |
| 2,970,387 | 2/1961 | Dean | 35/9 A |
| 3,324,577 | 6/1967 | Davis | 35/48 R |
| 3,344,536 | 10/1967 | Davis | 35/48 R |
| 3,504,445 | 4/1970 | Goldmark et al. | 35/9 A |
| 3,780,453 | 12/1973 | Hesener | 35/48 R |

*Primary Examiner*—John H. Wolff
*Attorney, Agent, or Firm*—Fleit & Jacobson

[57] ABSTRACT

Apparatus for playing an educational game in which a biassing means is included to resiliently urge the code bearing means in a direction wherein it is free to move, relative to another part of the apparatus once all, or a selected number, of setting means have been set by the user of the machine to positions corresponding to correct answers. This movement is used to actuate a visual, audible, or other signal.

6 Claims, 23 Drawing Figures

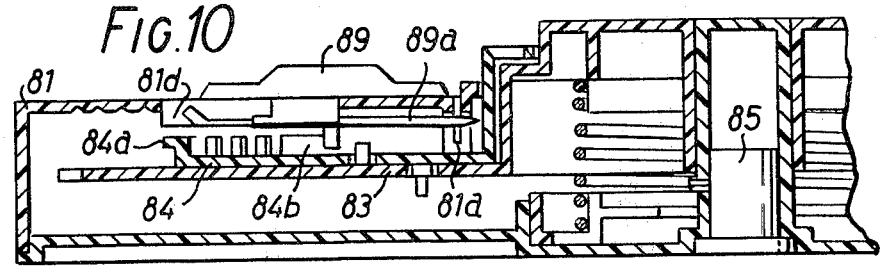
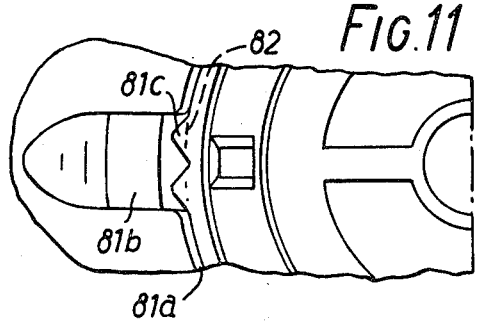
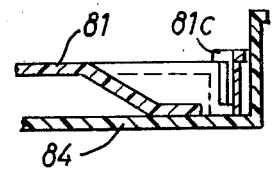
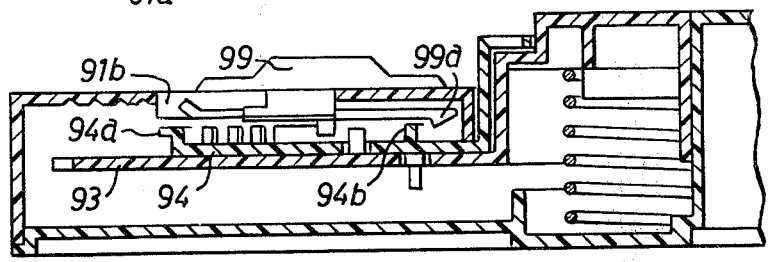
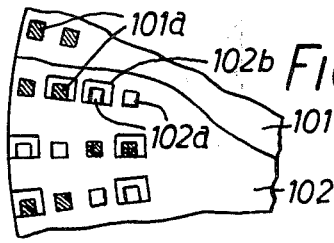
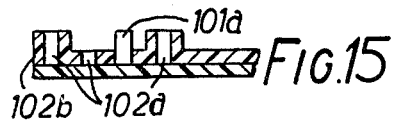

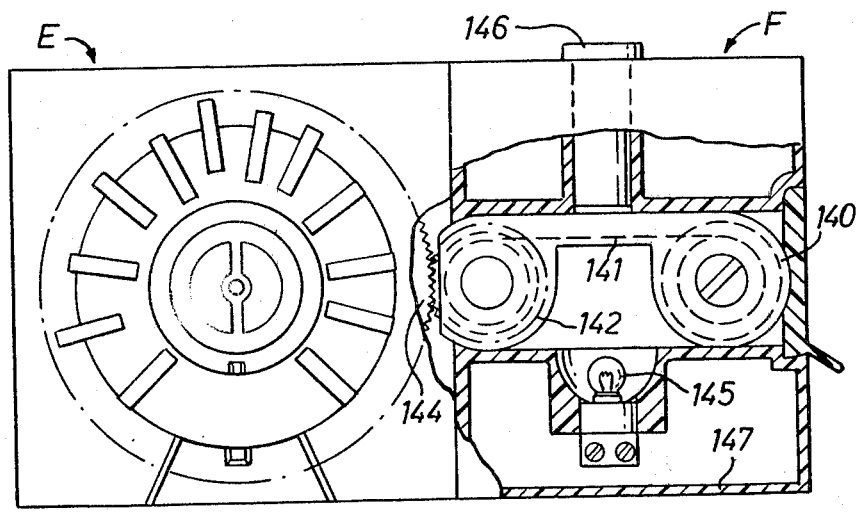
FIG.21
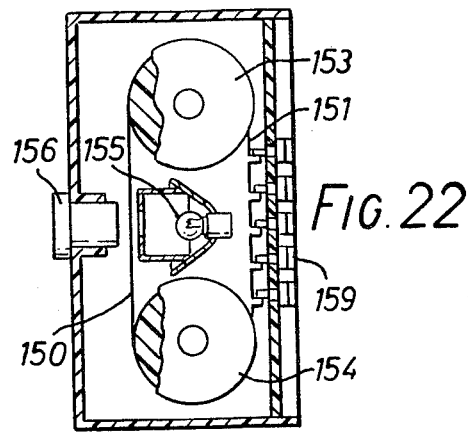
FIG.22
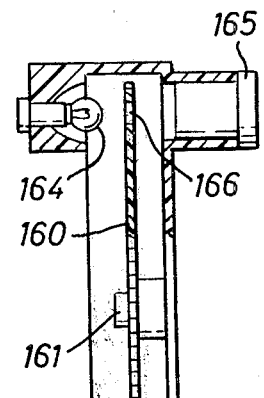
FIG.23
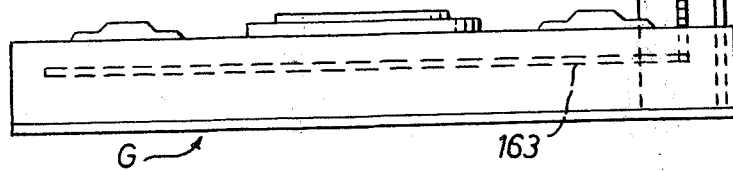

APPARATUS FOR PLAYING AN EDUCATIONAL GAME INCLUDING AUTOMATIC VERIFICATION MEANS

This application is a divisional of U.S. Pat. application Ser. No. 129,469, filed Mar. 30, 1971, now U.S. Pat. No. 3,780,453, issued on Dec. 25, 1973.

The invention relates to apparatus for playing an educational question-and-answer game. It may be used as a teaching medium for schools or for entertainment.

Known apparatus for playing an educational game is either very complex and expensive or else has a very poor verifying capacity, that is to say, they can only confirm the answers to a limited number of questions, and this may involve a repeat of a given pattern of answers which makes it easier for a user to defeat the machine.

The present invention aims to provide an easily operated verifying apparatus with a high verifying capacity using simple mechanical means. A principal object of the invention is to provide a verifying apparatus (that is to say an apparatus for playing an educational game) in which a member (herein called a code bearing means) automatically moves in a predetermined direction when one or a selected number of a plurality of other members (herein called setting means) is placed in a particular position (or respective particular positions) corresponding to a correct answer (or respective correct answers) to a question (or to a series of questions).

According to the present invention, an apparatus for playing an educational game comprises:

a housing;
a code bearing means supported by and at least partly concealed in said housing and adapted for movement in a predetermined direction relative to at least one part of the housing;
a plurality of code means on said code bearing means;
biassing means in said housing for biassing said code bearing means to move automatically in said predetermined direction; and
at least one setting means connected to said one part of the housing and constructed to be operable from outside the housing to be moved into any one of at least two possible answer positions, each of said possible answer positions corresponding to one of several possible answers to a given question and one of said possible answers being a correct answer, said setting means having means thereon which carry out a movement in a direction different from said predetermined direction when the position of said setting means is changed and which co-operate with said plurality of code means on the code bearing means to prevent said code bearing means from moving in said predetermined direction when the setting means is moved to a position corresponding to an incorrect answer, and to permit said code bearing means to move in said predetermined direction when moved to a position corresponding to a correct answer.

The apparatus according to the invention may be provided with individual error verification for each setting device in the form of illuminated apertures or an inserted verifying sleeve, according to the application. In cases where the code member is combined with a code orienting means it is further possible for both the code bearing means to have complementary code portions moulded onto them, so that on relative displacement of the two parts the sequence of correct answers, i.e. the resulting pattern of code means, will also be changed.

A specially preferred feature of the invention is the construction of the setting devices as sliders.

Further, according to an advantageous version of the invention, a support for transparencies is coupled with a movably mounted member of the verifying apparatus so that the two are functionally connected, and the apparatus is supplemented by a transparency viewing device.

In a modified construction the verifying apparatus is combined with a page dispenser having a cavity to receive pages, in such a way that the page cavity is secured against removal of a page by locking, if at least one setting device has been incorrectly set.

Preferred embodiments of the invention will now be described by way of example with reference to the accompanying drawings, in which.

Figure 1:
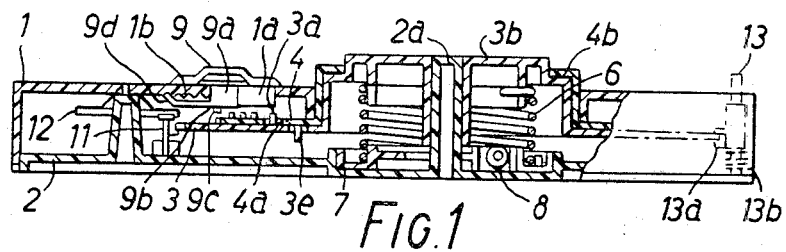
FIGS. 1 and 2 show apparatus according to the invention provided with a two part code bearing means mounted rotatably and axially displaceably in a housing, FIG. 2 being a partly broken away plan view and FIG. 1 being in cross section along the lines 1—1 of FIG. 2.
Figure 18:
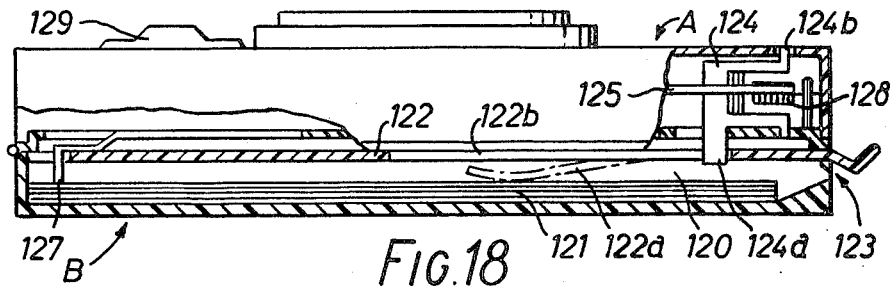
Figure 19:
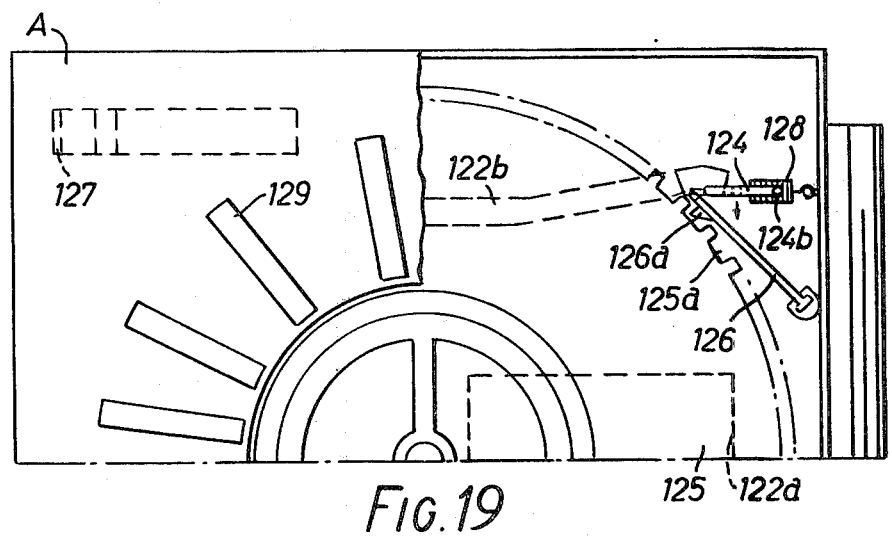
Figure 20:
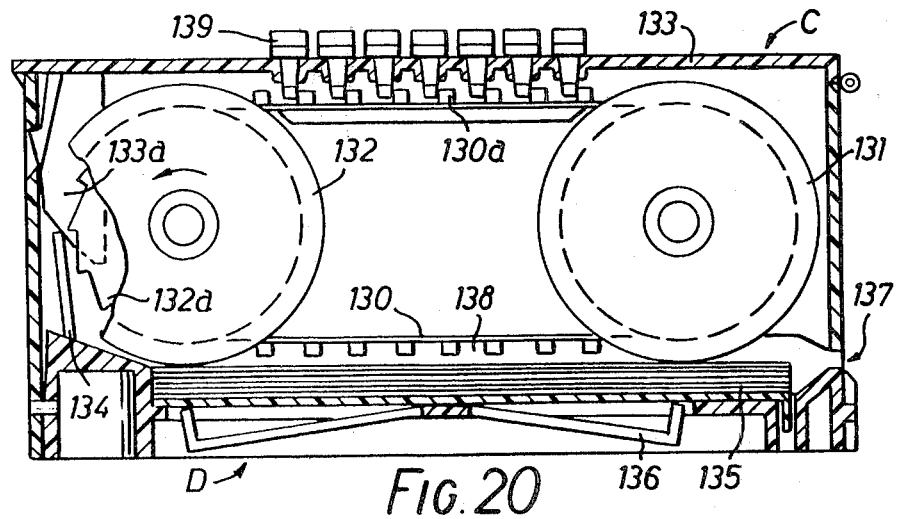

FIGS. 10 to 12 show apparatus in which the correct answer is marked on the code bearing means and can be viewed through an aperture defined by the housing when the setting means have been moved to an additional position, and in which an error recording strip is received in the housing to provide a permanent record of questions where the answer has to be so discovered, FIG. 10 showing a partial cross section elevation of the apparatus and FIGS. 11 and 12 showing respectively plan view and cross section portion of the apparatus where the error recording strip is inserted;

FIG. 13 shows a partial cross sectional elevation of apparatus in which an additional position is provided for the setting means for the same reason as described with reference to FIGS. 10 to 12, but instead of providing an error recording strip, the apparatus is constructed so that the setting means cannot be removed from the said additional position whereby it is clear which questions could not be answered without first discovering the answer;

FIGS. 14 and 15 show respectively a partial plan view in partial cross section, a two part code bearing means, that is to say a code bearing means and a code orienting means which have co-operating parts to form with the code means;

FIGS. 16 and 17 show similar views to FIGS. 14 and 15 but show another embodiment of the code means;

FIGS. 18 and 19 show respectively a partly broken away elevation and a partial view, again partly broken away, of apparatus co-operating for housing and dispensing pages bearing the questions;

FIG. 20 is a cross sectional elevation of apparatus having a code bearing member in the form of a band carried by two rollers and incorporating a page storing and dispensing device; and FIGS. 21 to 23 show embodiments of the invention including transparencies and means for viewing them, FIG. 21 being a partial broken away plan view of the transparency holding and viewing portion of apparatus coupled to the apparatus of FIG. 1, FIG. 22 showing a cross sectional elevation of apparatus similar to that of FIG. 20 where the page dispensing means are replaced by transparency viewing means, and FIG. 23 showing a partial cross sectional elevation of another embodiment of the transparency storing and viewing device coupled to the apparatus of FIG. 1.

Figure 2:
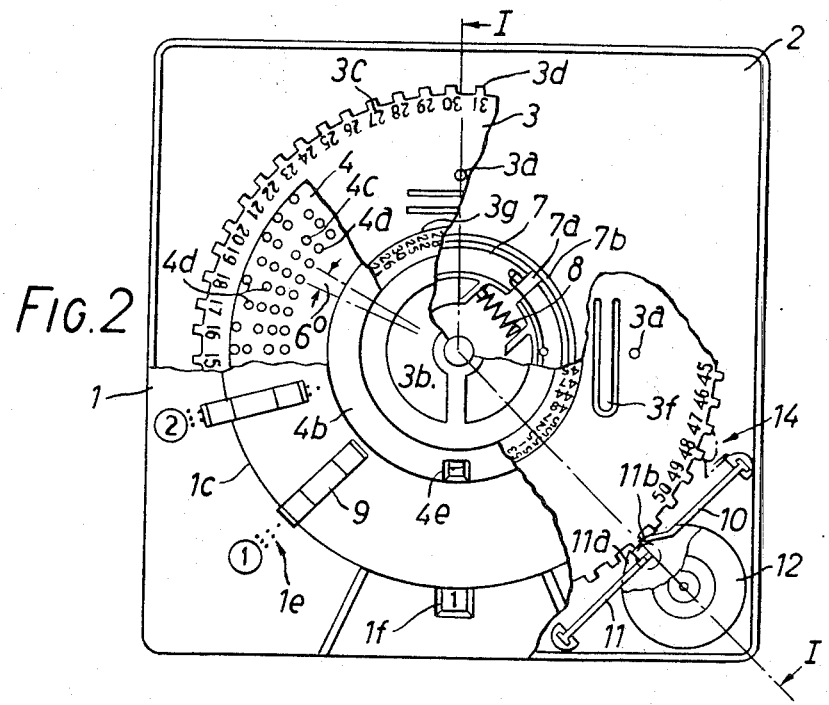

In the apparatus shown in FIGS. 1 and 2 the housing comprises a cover 1, acting as a support means for setting means 9 and the base 2. A code member, comprising in this embodiment a lower supporting disc 3 serving as a code orienting means and a code disc 4 serving as a code bearing means, is mounted rotatably and axially displaceably on a central pin 2a on the base 2. Pegs 3a engage in holes of a circle of holes 4a to prevent any relative turning between the two discs. The supporting disc 3 has a central portion 3b shaped as a turning knob and projecting through the cover 1 of the housing; the code bearing means (disc) 4 has an integral annular portion 4b surrounding the portion 3b. A spring 6 serving as a biassing means urges the discs 3, 4 upwardly and generates a torque between the base 2 of the housing and the said discs. To prevent overwinding of the spring 6 when the two discs are rotated with respect to the housing as will be described, a friction clutch is disposed between the lower end of the spring 6 and the housing base 2. The clutch is best seen in FIG. 2 and comprises an annular member 7 which is broken by a slot 7a. The annular member 7 is located within an area bounded by an upstanding annular wall 7b of the housing and the annular member is expanded by a compression spring 8 so that its peripheral surface resiliently grips the wall 7b. The strength of the spring 8 is such that when the torque is generated in the spring 6 reaches a predetermined force the annular member 7 slips within the walls 7b thereby preventing further torque being generated in the spring 6 during winding. The setting means are in the form of sliders 9. They are mounted in a circular arrangement - substantially radially displaceably — in guide grooves 1a in the cover 1. The lower edge portions 9b of the guide webs 9a of the slides are somewhat wider than the guide grooves 1a and engage over the lower edges of the grooves. The sliders 9 can thus be inserted in the grooves so that they will be held in them by the resilience of the material of the housing. The guide webs 9a are each provided with a peg 9c at the bottom. The sliders 9 have an inner neutral position marked by a circle 1c on the cover 1 of the housing. When they are in this position the pegs 9c are located between the locking pegs 4c of an uninterrupted circular row of pegs on the code bearing means, so that a verifying step of the coupled discs 3, 4 (resulting from the torque of the spring 6) is prevented so long as there is still a slider 9 in its neutral position. In this embodiment of the invention the code means permits three possible answers so there are three possible answering positions for each slider 9. These positions are marked on the housing at the places 1e with one, two and three dots. The code means is formed by projections in the form of generally cylindrical pegs 4d lying on three coaxial circles. The arrangement is such that for each row of pegs on a radius, only two pegs 4d and one space will be disposed on a radius. Adjacent radial rows of pegs are separated by an angle of 6° in this embodiment. The gap resulting from the absence of the third peg in each case determines the correct adjustment position of the slider 9 in question. Thus if all the sliders 9 are pushed out of their neutral position (i.e. free of pegs 4c) and positioned so that all the pegs 9c coincide with gaps in the code means, the two discs 3, 4 will be free to move together relative to the support means for the sliders and will carry out a rotary movement. This amounts to an anti-clockwise verifying step in view of the winding direction of the spring 6. This rotary movement is of 6°, since, when the discs 3, 4 have turned through 6°, the adjacent pegs 4d of the code means will strike the pegs 9c of the sliders 9. To enable the sliders 9 to be set more securely they are provided with integral locking springs 9d which interact with locking recesses 1b formed in the underside of the housing cover.

Assuming the apparatus to be equipped with twelve sliders 9, twelve questions would have to be answered per verifying step of the discs 3, 4. As a single verifying step is 6°, the discs 3 and 4 carry out sixty verifying steps per revolution, corresponding to a verifying capacity of 720 individual answer verifications.

To enable the apparatus to be set to any desired group of twelve questions, an indicating means formed by a continuous row of numbers 3c is provided on the outer, peripheral portion of the supporting disc 3, projecting beyond the code disc 4; this row of numbers can be viewed through a group aperture 1f.

In use, in order to set the apparatus to a given group of questions, the two coupled discs 3, 4 are pressed down by means of the knob 3b against the compressive action of the spring 6, until the slide pegs 9c are no longer in engagement with the pegs 4d of the code means. Then the two discs are turned clockwise until the desired numeral appears in the group aperture 1f. The spring 6 is wound more tightly automatically in this process. It cannot be overwound on account of the slipping clutch 7, 7a. When the knob 3b is released the discs 3, 4 are urged axially upwardly again by the spring 6, so that in the position set the slider pegs 9c and the code means pegs 4d come back into engagement. In order to prevent the code orienting disc 3 in its depressed position from springing back in a rotary direction owing to the torque of the spring 6, a resilient check lever 10 located below the normal position of the disc 3 engages in the teeth 3d on the periphery of the disc 3 and locks it in the desired direction. A resilient bell hammer 11 and its cam 11a are provided in the operating plane of the disc 3. As soon as the disc carries out a verifying step a tooth 3d on the disc 3 passes over the cam 11a, so that the subsequent springing back of the bell hammer 11 causes it to strike a bell 12 with its metal head 11b and generate an acoustic signal.

In a particularly preferred form of the invention, and in addition to setting the apparatus to any one of 60 different groups of questions, a primary adjustment to any one of 60 different series is possible, each series containing sixty groups of questions. This adjustment involves use of a code orienting means. For adjustment to a selected series the supporting disc 3 serving as a code orienting means has to be turned relative to the code disc 4 serving as a code bearing means. For this purpose the knob 3b is pressed downwardly far enough to make pegs 3e on resilient tongues 3f strike the base 2 of the housing. The springs 3f thereby move upwardly and lift the code disc 4 far enough to bring the pegs 3a out of engagement with the ring of holes 4a. Now the two discs 3, 4 can be turned relative to one another. An indicating means formed by the row of numerals 3g on a shoulder on the knob 3b allows the user to check the relative position. For the sake of improved enciphering these numerals are arranged in non-numerical sequence. The row of numerals 3g is checked through a series aperture 4e in the edge 4b of the code disc. This second opportunity for adjustment increases the verifying capacity to 60 × 720 = 43,200 individual verifications.

It should be noted that — again for the sake of good enciphering — the mutual spacing of two adjacent sliders 9 is at least equal to two rotary steps of the code means, i.e. at least 12°. In addition the spacings between two successive sliders 9 vary.

Since in a given type of apparatus the correct adjustment positions of the sliders 9 for each group of questions of each series are settled once and for all from the start, groups of questions can easily be adapted to the apparatus when they are being worked out, i.e. those of the alternative answers which are correct can always be provided with the correct dotted marks. More specifically, each lesson card containing, say, 12 questions must be provided with the group number, with the series number, with a continuous number of the 12 questions and with the correct association between the dotted marks 1e and the alternative answers.

The possible arrangement of an end stop for the supporting disc 3 is shown at the location 14 (FIG. 2). If such a stop is provided the groups in a series can no longer be selected at will. Instead the groups of questions have to be worked through continuously from the first group onwards.

In an alternative form of the invention, it is possible for the apparatus to be equipped with only one setting means or slider 9. In this case the correct position of the slider could readily be determined without knowledge of the anwer by experiment, i.e. by moving the slider backwards and forwards once. As soon as the slider peg 9c entered the gap in the code means the two discs 3, 4 would carry out the verifying step. This disadvantage can be avoided by using a testing key 13. This key 13 is urged upwardly by a compression spring 13b and in this position engages in a gap in the ring of teeth 3d by means of a lug 13a. Only when the slider 9 is correctly set and the testing key 13 additionally depressed can the discs 3, 4 carry out the verifying step. It is advisable to provide two testing keys 13, at a spacing such that both hands are always required to operate them, so that it is not possible to operate the testing key 13 with one hand and the slider 9 simultaneously with the other hand.

Where the verifying apparatus is to be used as a party game it is an advantage to provide an additional position (herein called an unblocking position) for the sliders, in which they cannot block the relative movement between the support means and the code bearing means. For example, if the apparatus has e.g. 6 sliders then — if there are only four players — two sliders can be made inoperative by putting them in the unblocking position. Furthermore, this additional position of the sliders makes it easy to check errors.

Figure 3:
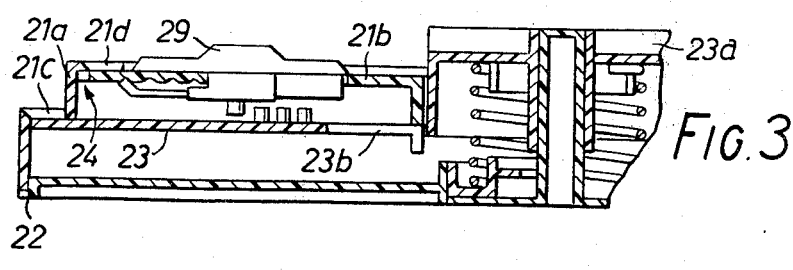
FIG. 3 shows a partial cross section of apparatus where the setting means are carried by supporting member supported by the housing, the housing and supporting member being relatively displaceable.

The apparatus in FIG. 3 differs from the example shown in FIGS. 1 and 2 primarily in the fact that the code orienting means takes a different form. The code bearing means 23 is the form of a disc. It again has a central portion 23a in the form of a turning knob. However, the support means for the sliders 29, namely the housing cover, comprises a frame 21a and a code orienting means in the form of a disc 21b which can turn relative to the frame 21a. The group setting is read in the group aperture 21c and the series setting in the series aperture 21d. In order to set a group of questions, the knob 23a is slightly depressed and turned clockwise until the correct group numeral appears in the aperture 21c. To verify the answers to group of questions the code bearing means 23 rotates relative to the support means 21a in a similar way to the embodiment of FIGS. 1 and 2. In order to set the apparatus to a different series the knob is depressed far enough to make resilient tongues 23b of the code disc 23 strike the base 22 and thus bend upwardly until the code orienting disc 21b, which is thereby raised, can turn freely. The series numeral is set in the aperture 21d by turning the disc 21b. In its operative position the disc 21b is held in position at its periphery by engagement between toothed rings 24 and the housing frame 21a.

Figure 4:
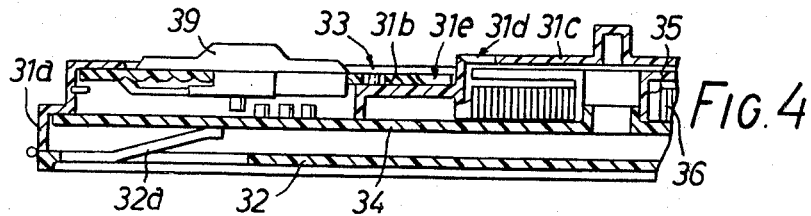
FIG. 4 is a partial cross section of apparatus having a code bearing member fixed within the housing and the setting means carried in a similar manner to that illustrated in FIG. 3.
Figure 5:
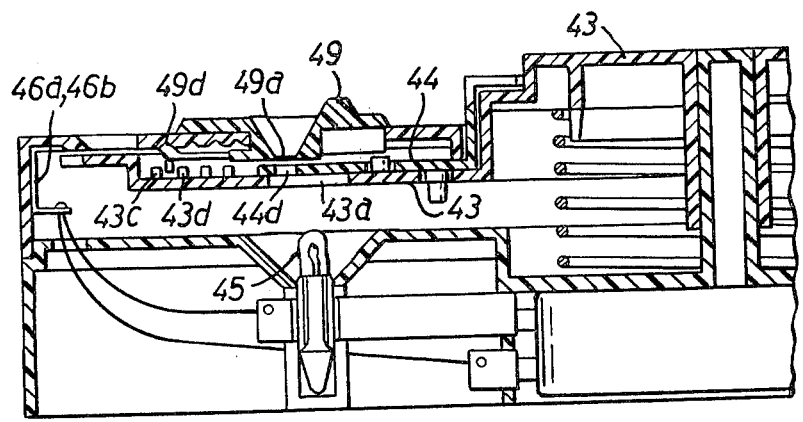
FIGS. 5 to 8 show an apparatus in which the types of each question answered by moving the setting means is verified by an illuminated portion of the setting means, FIG. 5 showing a partial cross section, FIG. 6 showing a partial top view, and FIGS. 7 and 8 showing parts of operating means for an electric light.
Figures 6, 7, 8:
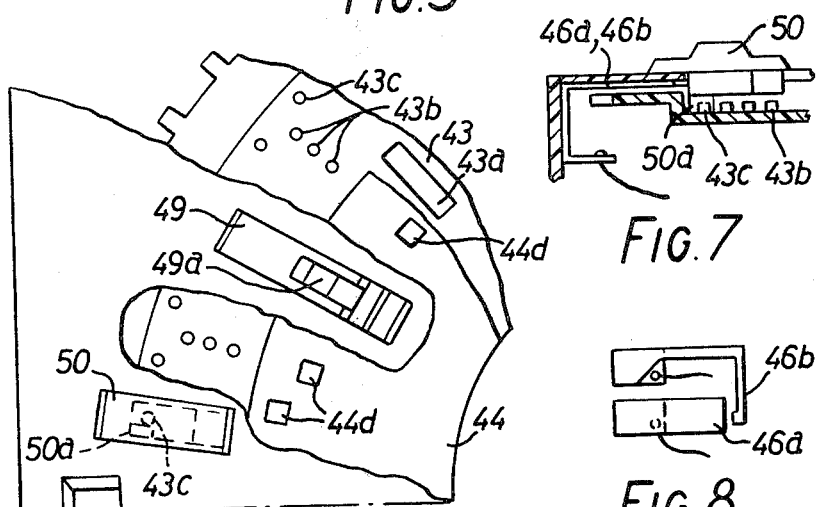

The apparatus in FIG. 4 has a code bearing means constituted by an interchangeable code disc 34 arranged non-rotatably in a housing 31a. It is pressed upwardly by resilient plates 32a of the base 32. The housing 31a and base 32 can be hinged together as shown. A verifying disc 35 is coupled to the code disc 34 in such a way that relative rotation is impossible. The support means member for the slider 39 (the setting means) is formed by an outer circular ring 31b. A central disc 31c serves as a code orienting means and is adjustably coupled to the ring 31b at 33. A spiral spring 36 acts between the verifying disc 35 and the central disc 31c. To set the apparatus to a given group numeral and a given series numeral the central disc 31c is depressed against the action of the resilient tongues 32a. The support means (ring 31b) and the code orienting disc 31c are then adjusted until the correct group numeral appears in the group aperture 31d and the series numeral in the series aperture 31e. The verifying steps are carried out jointly by the two coupled parts 31b and 31c.

A second embodiment of apparatus is shown in FIGS. 5 to 8. This has a basic construction like that in FIGS. 1 and 2. An important difference is that the code means consists no longer of projections but of apertures 44d in the code bearing means (disc) 44. For a system intended to indicate one correct answer out of three possibilities there is one aperture provided per radial line on the disc; this may be located on one of three concentric circles. The sliders 49 have a translucent verifying portion 49a and are movable radially. The code orienting disc 43 is provided with one radial slot 43a per code step of the code bearing means, so that each code means aperture 44d — whatever its position — can always be illuminated from below by lamps 45 through one of the slots 43a. The sliders 49 are moved out of a neutral position according to the choice of answer for the questions by the user. Once all the sliders 49 are positioned a contact slider 50 has to be actuated. This interacts both with control pegs 43 b, 43c on the disc 43 and with switching contacts 46a, 46b. In the normal position of the contact slider 50, i.e. with the switching contacts open, the outer peg of the appropriate group of pegs 43b lies against the side of a projection 50a on the contact slide cam in each case, as a result of a torque exerted on the discs 43, 44 by a torsion spring (not shown). When the contact slide 50 is moved against the contacts 46a, 46b it closes the light circuit. The two discs 43, 44 simultaneously advance abruptly by half a verifying step until a corresponding peg 43c strikes against the contact slider projection 50a. The code means apertures 44d are turned to bring them under the verifying translucent portions 49a of the sliders 49. With the sliders 49 correctly positioned the translucent portions are now illuminated. In order to prevent the incorrectly positioned sliders (with dark translucent portions 49a) from being displaced when the light circuit is operated, the locking springs 49d of the sliders 49 have a downwardly directed projection which is located somewhere between control pegs 43c, 43b in this position of the discs. When the contact slider is next moved back to its starting position, the two discs 43, 44 make a subsequent abrupt half verifying movement (until the radially outer peg of the next group of pegs 43b strikes against the contact slider projection 50). The sliders 49 can now be freely move again.

The group and series numerals are set in the same way as in the examples shown in FIGS. 1 and 2.

Figure 9:
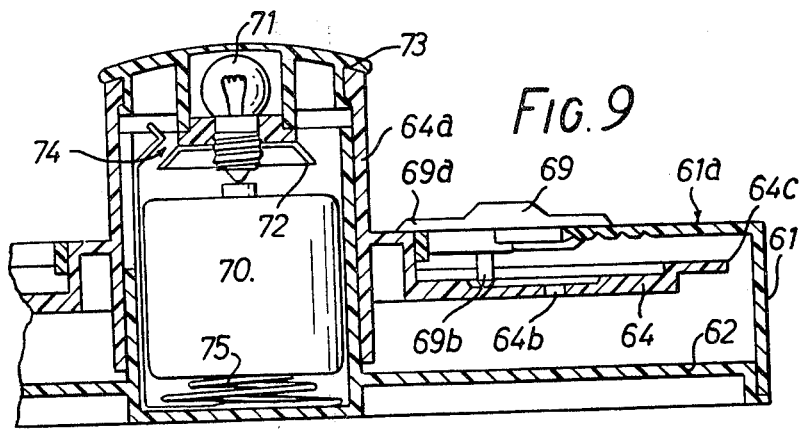
FIG. 9 shows an apparatus with a centrally mounted verifying light.

In FIG. 9 a further embodiment is shown. The housing comprises a cover 61 and a base 62. The code means (disc) 64 is rotatably mounted in the housing with its central portion 64a, in the form of a turning knob, projecting through the cover 61. The setting means are in the form of sliders 69. The code means consists of holes 64b in the code disc 64. Once all the sliders 69 are correctly positioned from their neutral position (in which the portions 69a thereof overlap one edge of the code disc 64) the slider pegs 69b register with the holes 64b of the code alignments. The code disc 64, including the battery 70, lamp 71, lamp contact 72 and covering cap 73, is moved upwardly by the spring 75 so that the electric contact 74 is closed and the lamp lights. The apparatus can be set to a different group of questions by turning the knob until the desired group numeral on a dial arranged at the peripheral portion 64c of the code disc 64 appears in a verifying aperture generally indicated at 61a.

The apparatus shown in FIGS. 10 to 12 has the same basic construction as that shown in FIGS. 1 and 2 but is extended to accommodate the refinement of a verifying sleeve. The sleeve 82 is accommodated in a circular slot 81a in the housing. It may, for example, be made of a strip of paper and should have self-adhesive end portions. When the sleeve has been placed in the slot 81a the self-adhesive ends are stuck together in a depression 81b in the housing cover 81. As the sleeve, when stuck together, has projections 81c engaging over it at least in the vicinity of the depression 81b in the housing, it can no longer be removed without tearing. The code bearing disc 83 and the code orienting disc 84 can be prevented from moving axially by means of a centrally fitted lock 85, so that only the set group of questions can be worked on and undesirable manipulations become impossible. Pointed marking members 89a pointing towards the sleeve are moulded onto the sliders 89. If someone cannot answer a question he has a chance to move the appropriate slider 89 inwardly into an additional position where the answer can be ascertained. The sslot 81d which guides the slider 89 is uncovered enough to make it possible to read a setting instruction given in a suitable place on the edge 84a of the code disc 84. The schoolchild can thereby position the slider 89 accordingly and will indirectly learn the correct answer. During the ascertainment of the answer the marking member 89a will have perforated the sleeve 82 in an appropriate place, so that the teacher will know later which questions could only be answered by moving the slide to expose the answer. It is advisable to provide the code disc 84 with elongated projections 84b so as to ensure that the slides will remain in engagement with the code disc 84 in both their neutral and verifying positions, so that no verifying step of the discs 83 and 84 will occur so long as a slider is still in one of the neutral and verifying positions.

The apparatus in FIG. 13 is very similar in concept to that described above. The sliders 99 can again be moved inwardly into an additional verifying position (where the answer can be ascertained) so that setting instructions can be read from the edge 94a of the code disc 94 through an open part 91b of the guiding slot. If a slider 99 is moved into the verifying position, a sprung locking tab 99a which is integral with it will engage behind a peg 94b of the code disc 94. A continuous circular raised portion could be provided instead of a plurality of pegs 94b. The sliders that are thus trapped by the tabs 99a will indicate to a teacher which questions defeated the user. In order to release the sliders the discs 93, 94 have to be moved axially downwards.

Instead of a verifying sleeve as in FIG. 10, a permanently fitted, rotatably mounted error counting ring (not shown) could be provided. It would be advanced step by step into the verifying position by a ratchet means as a result of displacements of the sliders. The verifying ring would be provided with a row of numerals, so that the number of errors could be read through an aperture or from a mark, according to the position of the ring.

As shown in FIGS. 14 and 15, the code bearing means comprises two overlapping parts 101, 102 which may, for example, be in the form of specially constructed concentrically mounted discs. After being previously axially displaced a certain distance relative to one another, these discs may be turned relative to one another by an amount equal to any number of rotary steps between adjacent rows of code means. The upper disc 102 has four radially aligned apertures 102a per radial row of code means. One of the two outer apertures 102a and one of the two inner apertures are surrounded by raised projections 102b. The lower disc 101 has either two outer pegs 101a or two inner pegs per radial row of code means. When the discs are brought axially together to constitute a code bearing means carrying a code means, these pegs pass through the apertures 102a. As a result of this arrangement, the projections and pegs standing proud of the upper disc constitute code means in the same way as the pegs 4d on the disc 4 in FIGS. 1 and 2. One of the positions in each radial row of code means always be left without a projection, whatever the position in which the upper disc 102 has been set relative to the lower disc 101. Thus there is always one space corresponding to a "correct answer" position of the slider, but the radial position of this space depends on the relative positions of the two discs 101, 102 which constitute the code bearing means. The remainder of the apparatus is constructed and operates as described with reference to FIGS. 1 and 2.

Another procedure way of achieving an adjustable arrangement of the code means on the code bearing means is for two outer apertures and two inner apertures 102a always to be regarded as pairs, of which one pair per radial row is provided with a projection 102b. In this case the two pegs 101a of the lower disc per radial row must be located either at the outside or at the inside. The same system can be used if the code means is designed for a different number of settings, that is to say, more than one correct answer from a number of possibilities. With a three-position code means, for example, no peg will be associated with the inner aperture of the upper disc, while one or other of the outer pair of apertures will have a peg. The lower disc must accordingly be provided either with two outer projections or with two inner projections per radial row, so that one of the possible settings per unit will always be left without a projection and correspond to a correct answer. The projections may of course be constructed differently and may, for example, be round.

The code bearing means in FIGS. 16 and 17 comprises a lower disc 111 and an upper disc 112 which covers and is mounted coaxially with the disc 111. The discs can be turned relative to one another a distance equal to any number of longitudinal units of code alignment. The code means is formed solely by apertures some of which (111a) are formed in the lower disc 111 and some of which (112a) are formed in the upper disc 112. The illustrated code means has four possible radial positions for an aperture, only one of which positions is occupied by an aperture formed by the overlapping of an aperture in one disc 111 with an aperture in the other disc 112. One disc 112 accordingly has one inner or one outer double aperture 112a per radial row of code means. Each double aperture 112a could be divided into two single apertures, as a modification. In the other disc 111, on the other hand, two apertures 111a are formed per radial row, one of which apertures is located in the circular region of the outer apertures 112a and the other in the circular region of the inner apertures 112a in the disc 112. This arrangement ensures that in any rotary position of the disc 111 relative to the disc 112 the apertures at any radial position will register (overlap) only in the region of one of the four possible settings. By turning the two discs 111, 112 relative to one another the resulting pattern of code means can be repeatedly continually changed at will. The same effect can be achieved if the code means is designed for a different number of possible settings. In a code means with three possible settings, one disc may have an outer one part or two part double aperture or an inner single aperture per radial row position, while the other disc is always provided with one inner aperture which is always on the same line and with one outer aperture which varies within the compass of the double aperture, per code radial row position. In a code means with six apertures, the apertures — for example in the upper disc — are simply made longer. It is unnecessary to explain how the code means described can interact in many different ways with setting means, e.g. sliders or translucent areas through which a light can be viewed.

The parts 111, 112 of the code bearing means in particular may be in the form of superimposed bands mounted on rollers in the manner described with reference to FIGS. 20 and 22 to be described later.

In the embodiment shown in FIGS. 18 and 19 a page dispenser B is arranged below the answer-verifying apparatus A, which is only represented diagrammatically but which corresponds to the construction described with reference to FIGS. 1 and 2. In a page cavity 120 there are a number of pages 121 printed with questions. A drawing plate 122 serves to transport the pages 121 through a delivery slot 123. A resilient tongue 122a presses on whichever page is uppermost. The plate 122 is locked by a pivot member 124 which is mounted for rotation about the spindle 124b and acted on by a tension spring 128. In the normal position the pivot member 124 is subject to a torque acting in the direction of the arrow. The lower web 124a passes through a guiding slot 122b in the plate 122 and lies in a lateral extension of the said slot for locking purposes. The plate is thus locked. A soon as the supporting disc 125 of the apparatus A carries out a verifying step as a result of the correct setting of all the sliders 129, the lever 126 is actuated with the aid of the toothing 125a and a cam 126a. The cam tips the pivot member 124 so that the plate 122 is released and the top page can be transported with it. As soon as the plate 122, and with it the top page, have been drawn forward a short distance, a rear clamp 127 descends and secures the other pages. When the plate is pushed back the pivot member 124 is automatically returned to its locking position owing to the shape of the guiding slot 122b.

In the FIG. 20 apparatus the code bearing means 130 is in the form of a band and runs over two rollers 131 and 132. Toothing (not visible) is provided only between the roller 132 and the band 130. A plurality of adjacent code means are provided on the band 130, formed by lateral rows of pegs 130a. These interact with sliders 139 mounted in the housing cover 133. The sliders 139 are generally similar to the sliders shown in FIGS. 1 to 4. The sliders 139 are also partly juxtaposed (although this cannot be seen from the Figure) so that the sliders which interact with a row of code means have a mutual spacing of at least two intervals between adjacent rows of code means. In order to set the apparatus to a given group of questions, the cover 133 has to be opened. When it is open it releases a locking spring 134 by means of an integral arm 133a. The spring engages in locking teeth 132a of the roller 132 and locks it against the action of a transporting spring (not shown). A row of numerals for verification and/or for setting the group of questions may be provided on the band 130. These numerals are exposed one at a time through an aperture in the housing (for the sake of simplicity neither the numerals nor the aperture has been shown). Below the answer-verifying apparatus C there is again a page dispenser D with a page cavity 138. The pages are shown at 135 and are pressed upwardly against the rollers 131, 132 by springs 136. After correct setting of all the sliders 139 an answer-verifying step the length of the spacing between adjacent rows of code means is carried out by the band 130 (the rollers 131, 132 also rotating) in the direction of the arrow. The top page is consequently moved towards the slot 137 far enough for it to be freed from the roller 132. As the roller is now blocked it retains all the other pages, while the released page is moved through the delivery slot 137 by means of the roller 13.

The code means may obviously be formed by apertures, illuminated in use, even when the code bearing means is in band form. Furthermore, the additional refinement of a code orienting means which has been described with reference to the embodiments of FIGS. 1 to 8 and 10 to 13 which include discs can readily be transferred to constructions involving a code bearing means 130 in band form for the purpose of additional series of questions. The code means and the code orienting means would thus comprise two relatively displaceable bands, and the indication device for the series setting must be associated with the two bands, while the indication device for the group setting must be associated partly with one of the bands and partly with the housing.

In the FIG. 21 example a further apparatus F is coupled to the answer-verifying apparatus E, which may, for example, correspond to that in FIGS. 1 and 2. The apparatus F contains an interchangeable cassette 140 equipped with a film 141. One of the two film bobbins 142, 143 is toothed and engages in a member 144 of the apparatus E, which member 144 is also toothed and which makes the answer-verifying switching steps. The projecting device comprises a bulb 145 and a lens 146. If the apparatus is operating a transparency of the film 141 is projected. The transparency contains questions. When these have been correctly answered and the sliders of the verifying apparatus E are correctly positioned, the apparatus carries out a verifying step, whereby the next transparency is brought in front of the lens.

In the FIG. 22 apparatus, transparencies are mounted on a band 150 which, like the code bearing band 151 parallel thereto, moves around the two rollers 153, 154. Toothing (not shown) is provided between the two bands 150, 151 and at least one of the rollers 153, 154. The projector device comprises the lamp 155 and the lens 156. The sliders are shown at 159. The remaining features and the manner of operation corresponds generally to FIG. 20.

In FIG. 23 an interchangeable disc 160 acts as the transparency support. It is mounted perpendicularly to the verifying apparatus G so as to rotate on a peg 161 of a supporting arm 162 placed on the apparatus G. The apparatus G may correspond to that described with reference to FIGS. 1 and 2. A toothed peripheral portion of the disc 160 engages in a toothed ring of a disc 163 of the apparatus G (which disc performs the answer-verifying steps) so that the disc 163 drives the disc 160. The projector device comprises a lamp 164 and a lens 165. One of the transparencies mounted in the disc 160 is shown at 166.

In the examples given in FIGS. 21 and 23 the apparatuses may be designed so that all the elements which are required when using transparencies can be added to the verifying apparatus G at a later stage.

If the game is to be played by several players at a party it is advisable for the pages of questions to be about the size of playing cards. It is further proposed that the playing cards should have several different markings, preferably at the back, whereby successive question cards at numerical intervals of one, two, three, etc. can be indicated in the same way; for example, cards with questions 1-3-5- . . . may have a red 2 and cards with questions 2-4-6- . . . a blue 2, cards with questions 1-4-7- . . . may have a red 3, those with questions 2-5-8- . . . a blue 3 and cards with questions 3-6-9- . . . a green 3, etc.; thus the cards may be dealt out quickly and safely, whatever the number of players, in such a way that the questions always have to be answered by one player after another. The colours may be allotted before the game by throwing dice. Chips (possibly with different values) may also be used (with prizes for correct answers and fines for incorrect ones).

What is claimed is:

1. Apparatus for playing an educational game comprising:
   a housing:
   a code bearing means supported by and at least partly concealed in said housing and adapted for movement relative to at least one part of the housing;
   a plurality of code means on said code bearing means;
   biassing means in said housing for biassing said code bearing means to move automatically in a predetermined direction; and
   a plurality of setting means connected to said one part of the housing and constructed to be operable from outside the housing, each of said plurality of setting means for movement into any one of at least two possible answer positions, each of said possible answer positions corresponding to one of several possible answers to a given question and one of said possible answers being a correct answer, each said setting means having means thereon which carry out a movement in a direction different from said predetermined direction when the position of said setting means is changed and which co-operate with said plurality of code means on the code bearing means to prevent said code bearing means from moving in said predetermined direction when any setting means is moved to a position corresponding to an incorrect answer, and to permit said code bearing means to move in said predetermined direction when a predetermined number of said setting means are moved to respective positions corresponding to correct answers.

2. Apparatus according to claim 1, wherein the biassing means is constituted by a spring disposed to act between the said one part of the housing and the code bearing means, the spring being associated by one of its ends to the code bearing means.

3. Apparatus according to claim 1, including a code orienting means which comprises a first disc, and wherein the code bearing means comprises a disc disposed above the first disc and concentric therewith, the discs being mounted for connection in rotation and adapted to be uncoupled from each other by relative axial movement; the first disc having a central portion in the form of a turning knob which extends upwardly through the housing and the code bearing means having a ring surrounding the knob and which also extends upwardly through the housing, and the first disc being toothed at its periphery for interaction with a check lever pivoted within the housing and which operates a signal device.

4. Apparatus according to claim 1, wherein the said slipping clutch comprises an annular member broken by a slot and disposed within an annular wall of the housing, a compression spring being disposed to expand the annular member so that its peripheral surface resiliently grips the said annular wall, and the biassing means comprises a helical spring, one end of the biassing means being disposed to bear against the annular member, so that when the torque generated in the helical spring reaches a predetermined level the annular member slips relative to the annular wall so preventing further torque being generated in the helical spring by further rotation of the code bearing means.

5. Apparatus according to claim 1 including at least one test key to block the relative movement between the code bearing means and the said one part of the housing.

6. Apparatus for playing an educational game, comprising:
- a housing;
- a code bearing means at least partly concealed in said housing and adapted for movement relative to at least one part of the housing,
- a plurality of code means on said code bearing means; biassing means in the housing for biassing said code bearing means and to move said code bearing means automatically in in a predetermined direction;
- at least one setting means connected to said one part of the housing and constructed to be operable from outside the housing to be moved into any one of at least two possible answer positions, each of said possible answer positions corresponding to one of several possible answers to a given question associated with the setting means and one of said possible answers being a correct answer;
- said setting means having means thereon which carry out a movement in a direction different from said predetermined direction when the position of said setting means is changed and which co-operate with respective code means to prevent relative movement between said code bearing means and said one part of the housing when any one setting means is in a position corresponding to an incorrect answer and to permit relative movement between said code bearing means and said one part of the housing when a predetermined number of said setting means are in respective positions corresponding to respective correct answers; and further comprising clutch means for preventing overstraining of said biasing means.

* * * * *